United States Patent
Wolz et al.

[11] Patent Number: 5,884,895
[45] Date of Patent: Mar. 23, 1999

[54] DEVICE FOR THE TIME-DEPENDENT CONTROL OF THE DURATION OF REGENERATION OF AN AIR DRIER

[75] Inventors: Dieter Wolz, Marbach; Alois Schnaeker, Filderstadt; Klaus Karthaeuser, Stuttgart; Rolf Weller, Pluderhausen; Ruediger Leopold, Weil Der Stadt; Klaus Heizmann, Leonberg, all of Germany

[73] Assignee: Robert Bosch GmbH, Stuttgart, Germany

[21] Appl. No.: 981,733
[22] PCT Filed: Mar. 30, 1996
[86] PCT No.: PCT/DE96/00561
 § 371 Date: Dec. 23, 1997
 § 102(e) Date: Dec. 23, 1997
[87] PCT Pub. No.: WO97/01473
 PCT Pub. Date: Jan. 16, 1997

[30] Foreign Application Priority Data

Jun. 27, 1995 [DE] Germany .......... 195 23 219.4

[51] Int. Cl.[6] ................................................. F16K 31/163
[52] U.S. Cl. ................................ 251/54; 251/63; 251/63.5
[58] Field of Search .................................. 251/54, 62, 63, 251/63.5, 48

[56] References Cited

U.S. PATENT DOCUMENTS

| | | | |
|---|---|---|---|
| 3,116,917 | 1/1964 | Cramer | 251/54 X |
| 4,525,183 | 6/1985 | Cordes et al. | 251/63.5 X |
| 4,657,224 | 4/1987 | Lattuada | 251/63.5 |
| 4,723,476 | 2/1988 | Stucky | 251/63.4 X |
| 4,987,919 | 1/1991 | Boutin | 251/63 X |

*Primary Examiner*—Kevin Lee
*Attorney, Agent, or Firm*—Edwin E. Greigg; Ronald E. Greigg

[57] ABSTRACT

An apparatus for time dependent control of a regeneration time of an air-dryer. The control apparatus has a shutoff valve, which is disposed in a line between a tank that furnishes regeneration air and an air dryer that can be regenerated by the countercurrent method. For the regeneration of the air dryer, the shutoff valve is switched into an open position by a control pressure and is returned to its closing position by spring force counter to a pneumatic delay device which concludes the regeneration. In the pneumatic delay device, air is displaced through a throttle restriction in the form of a permeable membrane, for instance of porous polytetrafluoroethylene. The apparatus for time-dependent control of the regeneration time of an air dryer is intended in particular for compressed air systems of motor vehicles.

8 Claims, 1 Drawing Sheet

U.S. Patent  Mar. 23, 1999  5,884,895

DEVICE FOR THE TIME-DEPENDENT CONTROL OF THE DURATION OF REGENERATION OF AN AIR DRIER

PRIOR ART

The invention is based on an apparatus for time-dependent control of the regeneration time of an air dryer.

One such device is already known (European Patent Disclosure EP 0 036 569 A1) in which a spring-loaded piston connected to the shutoff valve is displaceable between two cylinder chambers of a cylinder by differential pressure. The two cylinder chambers communicate through throttle bores of different cross sections and with the interior of the air dryer. The compressed air they contain is used, along with the air taken from a supply air tank, to regenerate the air dryer. The known apparatus requires a relatively large amount of installation space. Moreover, the length of the regeneration phase is dependent on consumerdictated pressure fluctuations in the compressed air system as well as on production-related differences among the throttle bores.

ADVANTAGES OF THE INVENTION

The apparatus according to the invention is advantageous over the prior art in that the action of the throttle restriction is adjustable to very close tolerances. This can be done by modifying the structure of the membrane, or in other words its mean pore diameter, pore volume, effective membrane surface area, and membrane thickness. On the condition of replicable pressure conditions of the air penetrating the membrane, it is thus possible to attain a very accurate time-dependent control of the regeneration time. The regeneration of the air dryer is therefore controllable without unnecessary consumption of compressed air.

Based on a choice of material consistent performance of the membrane over the service life of the air dryer can be expected, since the material is largely resistant and dirt-repellent.

With a refinement of the device not only is the introduction of air into the hollow chamber achieved, but the sealing off of the piston from the hollow chamber is attained, if the air is positively displaced from the hollow chamber on its way through the membrane.

The embodiment of the invention defined herein is a space-saving way, that is also practical to produce and install, of combining the elements of the regeneration time control apparatus, which includes the delay device, the shutoff valve, and the actuating means.

Further advantages will become apparent from the ensuing description of the apparatus according to the invention.

BRIEF DESCRIPTION OF THE DRAWINGS

One exemplary embodiment of the invention is shown in simplified form in the drawing and is described in further detail in the ensuing description.

DESCRIPTION OF THE EXEMPLARY EMBODIMENT

Figure 1:
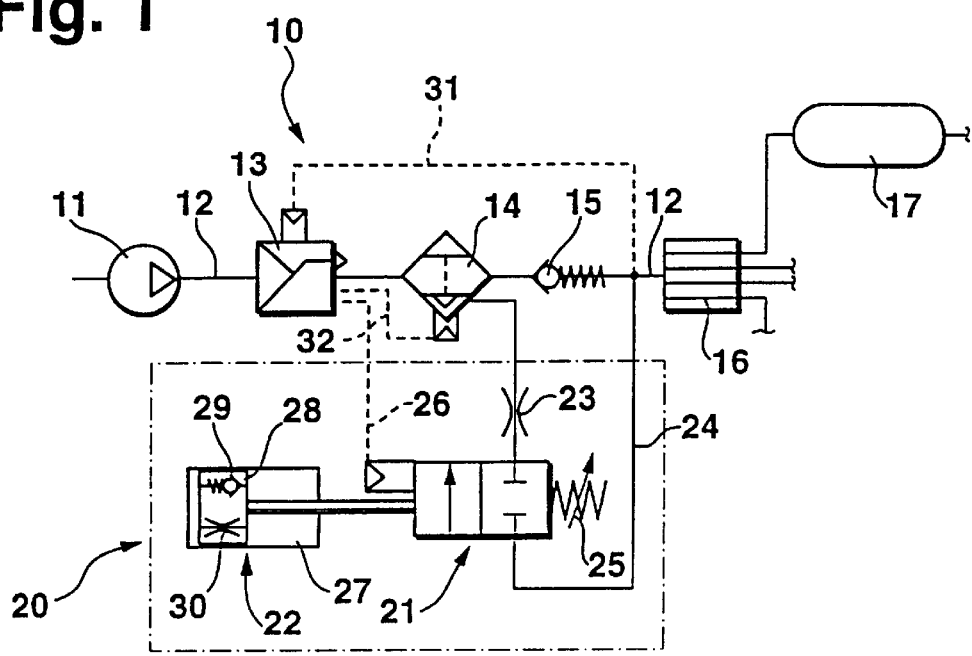
FIG. 1 shows a circuit diagram of a compressed air system, shown only in part, with an air dryer.

The circuit diagram in FIG. 1 shows a compressed air system 10, specifically both the energy supply and part of the transmission equipment of a brake system for utility vehicles. The compressed air system 10 has an air compressor 11 with a feed line 12 connected, thereto the feed line has in succession in the feed direction, a pressure controller 13, an air dryer 14, a one way check valve 15 and a guard valve 16. A supply tank 17 for compressed air of a consumer circuit, not otherwise shown, is connected to the guard valve 16. No other consumer circuits of the compressed air system 10 are shown here.

The air dryer 14 is a so-called single-chamber air dryer. It contains a drying medium, with which moisture-laden compressed air pumped by the air compressor 12 and arriving from being distributed to the consumer circuits, is dehumidified. The drying medium absorbs the moisture until its drying capacity is exhausted; this is why the air dryer 14 requires regeneration of its drying medium. To that end, an apparatus 20 for the time-dependent control of the regeneration time of the single-chamber air dryer 14 is provided. The regeneration time control apparatus 20 includes a shutoff valve 21, a pneumatic delay device 22, and a throttle 23. The shutoff valve 21 is in series with the throttle 23 in a scavenging line 24, which begins at the feed line 12 between the check valve 15 and the guard valve 16 and discharges into the air dryer 14. The shutoff valve 21 is a 2/2-way valve, with a closing position as its basic position. It can be switched pneumatically into its open position counter to the force of an adjustable restoring spring 25. To that end, the shutoff valve 21 is connected to the pressure controller 13 by a control line 26. The delay device 22, operatively connected to the shutoff valve 21, is shown as a cylinder 27 with a piston 28, in which a check valve 29, connecting the two cylinder chambers, and a throttle restriction 30 are both accommodated. Also shown in the circuit diagram of FIG. 1 are two control lines 31 and 32. The control line 31 begins at the feed line 12 between the check valve 15 and the guard valve 16 and leads to a control input to the pressure controller 13. The control line 32, conversely, extends from a control output of the pressure controller 13 and leads to a control input of the air dryer 14, in order to switch the air dryer into the regeneration mode.

The mode of operation of the regeneration control apparatus 20 is as follows:

The compressed air pumped by the air compressor 11 is carried, as already mentioned, through the feed line 12 to the guard valve 16 and distributed to the consumer circuits. When an upper limit pressure in the consumer part of the compressed air system 10 is reached, the pressure controller is switched over, via the control line 31. The air compressor 11 now changes over to the idling mode. With the switchover of the pressure controller 13, or even during the pumping mode of the air compressor 11, the shutoff valve 21 is switched into its open position via the control line 26, counter to the force of the restoring spring 25. At the same time, the piston 28 of the delay device is displaced in the cylinder 27. In this process, air passes through the check valve 29 from one side of the piston 28 to the other side thereof. With the switchover of the pressure controller 13, the air dryer 14 is moreover switched to the regeneration mode, via the control line 32. Dry compressed air, drawn from the air tank 17, now flows through the scavenging line 24 to the throttle 23, where the compressed air is depressurized and discharged to the air dryer 14. The dry air is passed in a countercurrent through the air dryer 14 and discharged to the atmosphere. The air in the drying medium absorbs the water that has accumulated in the air dryer 14, so that the air dryer is regenerated thereby, or in other words regains its capacity of extracting the moisture from compressed air pumped to it.

For the duration of the regeneration process, the restoring spring 25 seeks to return the shutoff valve 21 to its basic position. The throttle restriction 30 in the piston 28 of the delay device 22 presents resistance to such a return, by delaying the return flow of the air from one side of the piston 28 to the other. After a preselected period of time determined by a suitable design of the throttle restriction, the shutoff valve switches into its closing position. This concludes the regeneration phase of the air dryer 14. The regeneration time or duration is set such that any unnecessary consumption of compressed air from the air tank 17 is avoided and that complete regeneration of the air dryer is attained. If the consumer causes the air pressure in the consumer circuits of the compressed air system 10 to drop to a lower limit value, then the pressure controller is switched over to the filling position and the air dryer 14 is switched over to the dehumidifying mode. The compressed air pumped by the air compressor 11 is dehumidified, as described at the outset, by the regenerated air dryer 14 and discharged to the consumer circuits.

Figure 2:
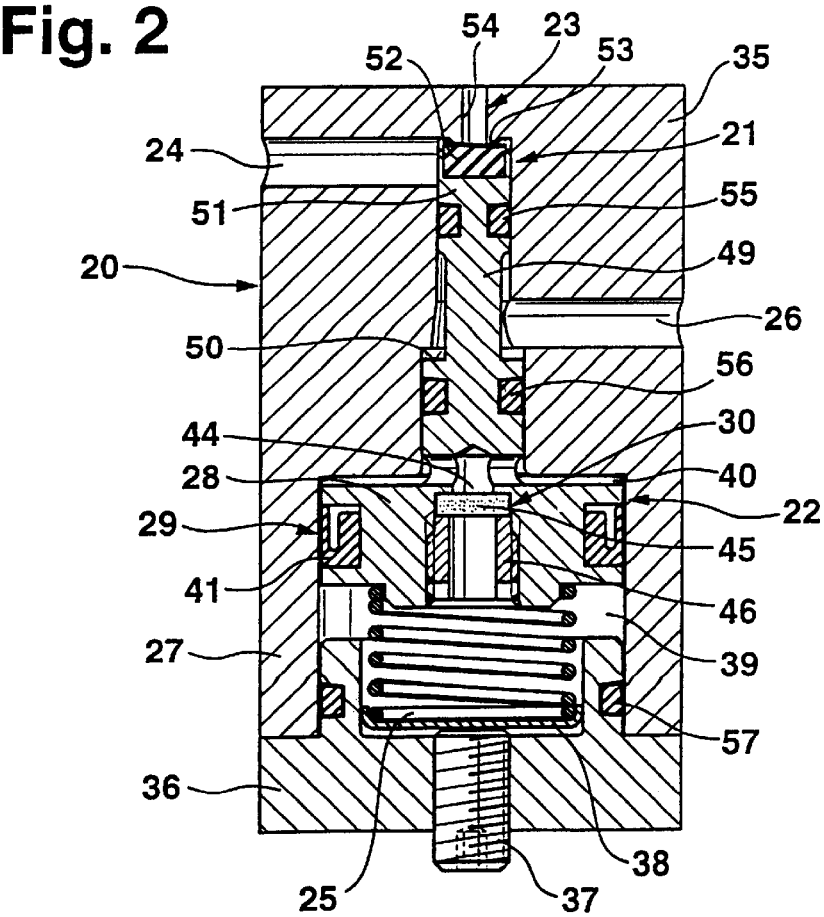
FIG. 2 shows a section through an apparatus for controlling the regeneration time of the air dryer.

The exemplary embodiment of the regeneration time control apparatus 20 shown in FIG. 2 includes a housing 35, in which the throttle 23, shutoff valve 21 and delay device 22 are combined. The regeneration time control apparatus 20 may be fitted into the single-chamber air dryer 14.

The cylinder 27 of the delay device 22, embodied in the housing 35, is closed off by a cylinder cap 36. Coaxially to the piston 28, which is received longitudinally movably in the cylinder 27, the cylinder cap 36 is penetrated by an adjusting screw 37, on which a spring plate 38 is supported inside the cylinder. Seated on this spring plate is the restoring spring 25, embodied as a helical compression spring, of the shutoff valve 21. The spring 25 engages the piston 28, which divides a spring chamber 39, containing the spring, from a hollow chamber 40 of the cylinder 27 that is located above the piston. The prestressing of the spring 25 can be varied by means of the adjusting screw 37.

A shaft sealing ring 41 is received on the piston 28, to seal it off from the cylinder 27. This sealing ring acts as the check valve 29 shown in the circuit diagram of FIG. 1: Upon the downward stroke of the piston 28, air at atmospheric pressure is capable of emerging from the spring chamber 39 to reach the hollow chamber 40 on the other side of the cylinder; in the reverse direction, however, this course is blocked by the shaft sealing ring 41. The piston 28, which acts as an adjustable wall, is in this way bypassed by the check valve 29 whose admission direction is into the hollow chamber 28.

The piston 28 has a through bore 44, formed by both an axial bore and a transverse bore, that connects the spring chamber 39 to the hollow chamber 40. A disk 45 of porous polytetrafluoroethylene, which acts as an air-permeable membrane, is received in the through bore 44. A material of this kind is sold by the company doing business as Berghof Labor- und Automationstechnik GmbH, D-72800 Eningen, Federal Republic of Germany. The membrane acts as the throttle restriction 30, shown in the circuit diagram of FIG. 1, of the delay device 22. The disk 45 is fastened in the through bore 44 by a bush screw 46. Air in the hollow chamber 40 can take its course into the spring chamber 39 only through the disk 45. The resistance that the disk 45 presents to the air is determined by the mean pore diameter, the pore volume, the effective surface area, and the thickness of the disk 45.

On the side remote from the spring, the piston 28 is provided with a stepped piston rod 49. Following a step face 50 that reduces the cross section, the piston rod 49 is continued with an end portion 51, which on its free end has a closing member 52 of the shutoff valve 21. The closing member 52 is supported, in the basic position shown for the shutoff valve 21, on a valve seat 53 toward the housing. On the side toward the closing member, a portion of the scavenging line 24 discharges into the housing 35; on the side toward the valve, there is a bore 54 in the housing 35, and as indicated in the circuit diagram of FIG. 1 this bore forms the throttle 23 in the portion of the scavenging line 24 leading to the air dryer 14. Also discharging into the housing 35 is a portion, communicating with the step face 50, of the control line 26 that extends from the pressure controller 13. The piston rod 49 is sealed off from the housing 35, between the portion of the scavenging line 24 and the portion of the control line 26, by a sealing ring 55. A second sealing ring 56 divides the portion of the control line 26 from the hollow chamber 40; a third sealing ring 57 between the cylinder cap 36 and the cylinder 27 prevents dirt from getting into the spring chamber 39, while a fourth sealing ring can be disposed for the same purpose between the adjusting screw 37 and the cylinder cap.

The regeneration time control apparatus 20 can be made operative as follows:

By feeding control pressure into the control line 26, a force is exerted on the step face 50 of the piston rod 49 that axially displaces the piston 28, with the piston rod 49, counter to the force of the spring 25 until the piston strikes the cylinder cap 36. In the process, the air located in the spring chamber 39 is positively displaced, and on overcoming the shaft sealing ring 41 it reaches the hollow chamber 40, which has been enlarged by the piston motion. At the same time as the displacement of the piston 28, the shutoff valve 21 is also switched from the closing position to the open position. As the control pressure falls away at the step face 50, the restoring motion of the piston 28 begins. The restoring force exerted on the piston 28 by the spring 25 effects a compression of the air enclosed in the hollow chamber 40, which can pass only through the through bore 44 into the pressureless spring chamber 39. The throttling action of the polytetrafluoroethylene disk 45 presents a resistance to this passage of the air; that is, the piston 28 does not reach its outset position, in which it closes the shutoff valve 21, until after a certain period of time. This length of time, which determines the regeneration time, can be varied not only by how the disk 45 is embodied, but also by adjusting the prestressing of the spring 25 by means of the axially adjustable adjusting screw 37. Moreover, the volume of the hollow chamber 40 can also be used to vary the regeneration time setting.

The foregoing relates to preferred exemplary embodiments of the invention, it being understood that other variants and embodiments thereof are possible within the spirit and scope of the invention, the latter being defined by the appended claims.

We claim:

1. An apparatus (20) for time-dependent control of a regeneration time of an air dryer (14), for compressed air systems (10) of motor vehicles, comprising a shutoff valve (21), disposed in a line (24) between an air tank (17) containing compressed air and the air dryer (14), which for the regeneration of the air dryer (14) is switched into an open position by a control pressure and is returned by spring force counter to a pneumatic delay device (22) to a closing position that concludes the regeneration, wherein air is displaced through a throttle restriction (30) in the pneumatic delay device (22), the throttle restriction (30) is formed by a permeable membrane or disk (45).

2. An apparatus of claim 1, in which the membrane or disk (45) comprises porous polytetrafluoroethylene (PTFE).

3. An apparatus of claim 1, in which the membrane or disk (45) is disposed in a through bore (44) of a displaceable wall (28) of the delay device (22), said wall (28) on one side defines a hollow chamber (40) and on another side is under the influence of a compression spring (25).

4. An apparatus of claim 3, in which the displaceable wall (28) is movable by the control pressure counter to a force of the compression spring (25) into a position that enlarges the hollow chamber (40).

5. An apparatus of claim 4, in which the displaceable wall (28) is bypassed by a check valve (29) with an admission direction into the hollow chamber (40).

6. An apparatus of claim 5, in which the displaceable wall (28) comprises a piston (28) in a cylinder (27) and has a shaft sealing ring (41) that acts as a check valve (29).

7. An apparatus of claim 6, in which the piston (28) has a stepped piston rod (49), whose end portion (51) remote from the spring has a closing member (52) of the shutoff valve (21), while one step face (50) of the piston rod (49) forms an action face for the control pressure.

8. An apparatus of claim 7, in which the compression spring (25) is seated with a face end remote from the piston on a spring plate (38) that is axially adjustable.

* * * * *